Feb. 14, 1933. A. W. HARRIS 1,897,841

TRANSMISSION SHIFTING MECHANISM

Filed June 8, 1931

Inventor
Arthur W. Harris

By Blackmore, Spencer & Hiub
Attorneys

Patented Feb. 14, 1933

1,897,841

UNITED STATES PATENT OFFICE

ARTHUR W. HARRIS, OF TOLEDO, OHIO, ASSIGNOR TO GENERAL MOTORS CORPORATION, OF DETROIT, MICHIGAN, A CORPORATION OF DELAWARE

TRANSMISSION SHIFTING MECHANISM

Application filed June 8, 1931. Serial No. 542,895.

This invention relates to transmission mechanisms and has particular reference to a means for retaining in position the shift lever which shifts the forks of transmissions of automotive vehicles.

The invention resides in pivoting to the shift lever a bracket having a pair of laterally extending arms. Each arm is provided with an opening in which a rod or bolt is slidably mounted. Each bolt has a spherical head which is positioned in an opening in a stationary plate attached to the transmission housing. The shifter forks move beneath the plate and are provided with a recess in which the spherical heads engage when the forks are in a position such that they cause their respective gears to be disengaged. A spring surrounds each bolt or rod and constantly urges the spherical heads against the forks. When the lever is shifted to either side of its neutral position, the springs will tend to urge the lever still farther in the direction in which it has been shifted and at the same time push upwardly thereon to hold against its seat the spherical ball of the shift lever positioned at the top of the dome of the transmission. The device of the invention, therefore, performs the triple function (1) of retaining the shifter forks and gears in position, (2) preventing rattle of the parts, (3) and holding the ball of the shift lever against the seat at the top of the transmission dome.

Figure 1:
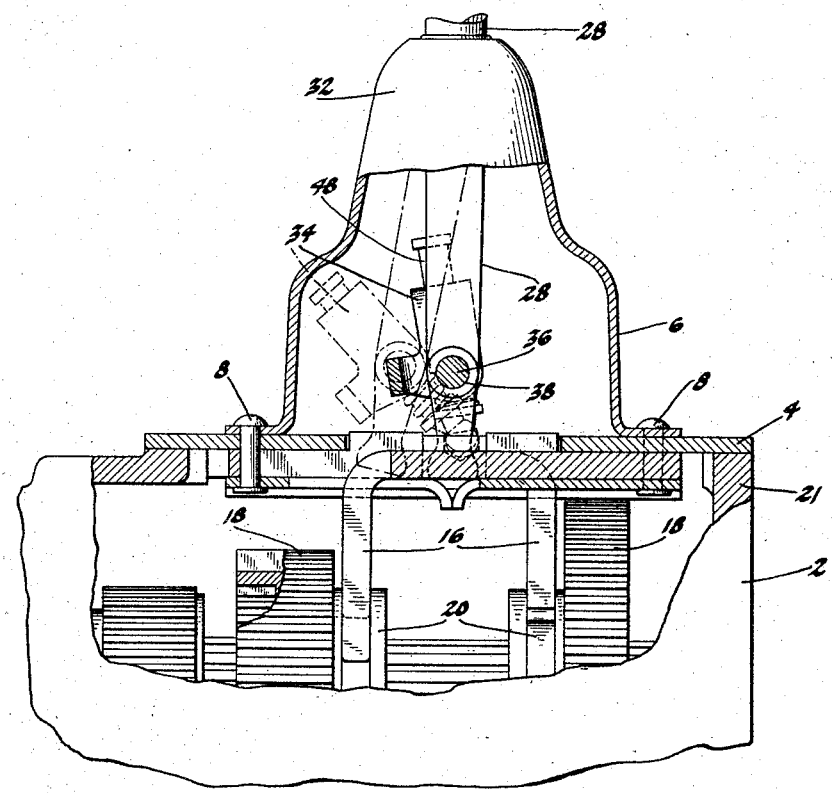
Figure 1 is a sectional view through a portion of a vehicle transmission showing the lever in neutral position in full lines and in one of its extreme positions in dotted lines.

Referring to the drawing, the numeral 2 indicates the transmission housing as a whole. On the transmission housing, there is permanently mounted the plate 4 which has rigidly mounted thereon the dome 6. The dome is held in place by means of the rivets 8. A supporting plate 10, U-shaped in cross section, is secured to the plate 4 by means of rivets 12. On the U-shaped portion of the plate 10, the slidable branches 14 of the shifter forks 16 are mounted. The forks 16 extend into the transmission housing as shown in Figure 1 and engage with the gears 18 through the intermediary of the collars 20.

Figure 2:
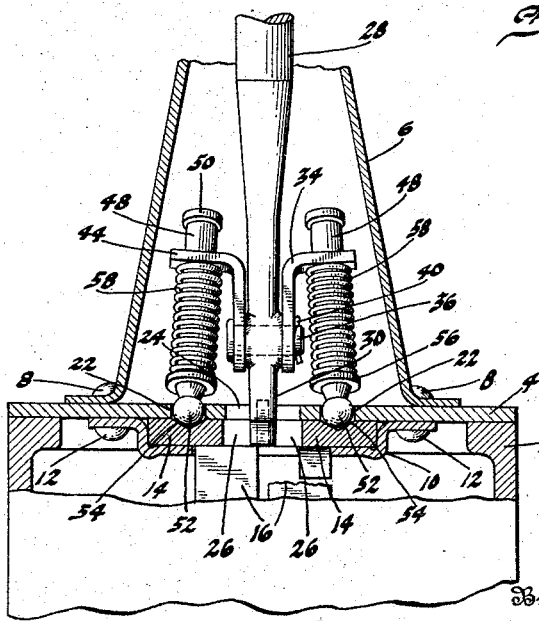
Figure 2 is a section at right angles to Figure 1 taken substantially through the middle portion of the dome.
Figure 3:
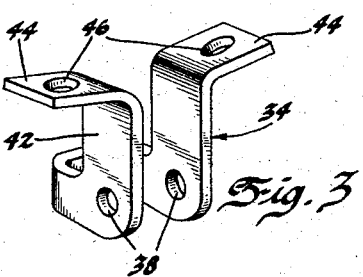
Figure 3 is a perspective view of the bracket.

The plate 4 is provided with the lateral openings 22 and the central opening 24. Each slidable branch 14 of the forks is provided with a recess 26, which recesses mate with the opening 24 as shown in Figure 2.

A shift lever 28 extends into and is swivelled at the upper portion of the dome and has its lower end 30 extending through the opening 24 and into the recesses 26 in the forks. At the upper portion 32 of the dome, the usual spherical ball member is provided which fits in the usual spherical seat. This structure is conventional and is not shown.

The invention resides in providing a bracket 34 pivoted relative to the lever 28 by means of the pin 36 passing through openings 38 in the bracket and a suitable mated opening in the lever 28. A cotter pin 40 holds the pin in place. The bracket has the upstanding arms 42 and the lateral arms 44. Each arm 44 is provided with an opening 46 for the reception of a bolt or pin 48 having the head 50 at one end and the spherical ball head 52 at its other end. The ball 52 projects into and constantly bears against the sides of the openings 22 in the plate 4 and seats in one of a number of recesses 54 in the slidable branches 14 of the forks 16. Each bolt or pin 48 has the collar 56 adjacent the ball head 52 and a coil spring 58 surrounds each bolt and is confined between the collar 56 and the arms 44 of the bracket 34. The springs 58 are under compression and constantly urge the ball heads 52 into the recesses 54.

When the parts are in the full line position shown in Figure 1, the action of the springs substantially will be on a vertical line and urge the lever 28 in an upward direction to cause the spherical swivel member at the upper portion 32 of the dome 6 to be held on its seat and also force the spherical heads 52 into the neutral recesses 54 of the shifter members 14. This constant pressure in an upward and downward direction will hold the parts in a neutral position and also prevent rattle.

When the lever 28 is shifted to either side to one of its extreme positions, as shown in the dotted line position in Figure 1, the bracket 34 will be inclined as shown. The springs are still under compression and constantly will urge the head into the recesses 54, a different recess for the new position of the shifted fork. The tendency of the springs to expand also will urge the lever 28 toward the direction in which it has been shifted. This will keep the lower end 30 of the lever tightly against the end of the recess 26 to prevent rattle. The springs at the same time will continue to urge the lever 28 upward to keep the ball in the upper portion 32 of the dome against its seat although the upward force of the springs on the lever 28 now will be diminished.

I claim:

1. In a shifting mechanism, a movable shift lever, a stationary plate having an opening in which the end of the lever is received, and means positively attached to the lever and constantly bearing on the plate in a single position to hold the lever in a given position.

2. In a shifting mechanism, a movable shift lever, a stationary plate having an opening through which the lever passes, and means positively attached intermediate its ends to the lever including a spring and constantly bearing against the plate in a single position to hold the lever in a given position.

3. In a shifting mechanism, a movable shift lever, a stationary plate having an opening through which the lever passes, a bracket attached to the lever, a rod slidably mounted in the bracket and engaging the plate, a spring mounted on the rod and held between the rod and bracket, said spring and rod holding the lever in a given position.

4. In a shifting mechanism, a movable shift lever, a stationary plate having an opening through which the lever passes, shiftable members beyond said opening operable by the movement of the lever, a bracket mounted on the lever, a plurality of rods slidable in the bracket, springs mounted on the rods and constantly urging the rods against the members to retain the lever and members in certain positions.

5. In a shifting mechanism, a movable shift lever, a stationary plate having an opening through which the lever passes, and means attached to the lever and constantly and resiliently urged against the plate to retain the lever in a given position, said plate having an opening through which the end of said means passes to engage the shifting mechanism.

6. In a shifting mechanism, a movable shift lever, a stationary plate having an opening through which the lever passes, and means attached to the lever and constantly and resiliently urged against the plate to retain the lever in a given position, said plate having openings to receive and retain a portion of said means for all positions of said lever.

7. In a shifting mechanism, a movable shift lever, a stationary plate having an opening through which the lever passes, and means to hold said lever in a given position, said means being attached intermediate its ends to said lever and constantly bearing on said plate at one of its ends and having its other end free.

In testimony whereof I affix my signature.

ARTHUR W. HARRIS.